C. J. MÜLLER.
REPLACEMENT VALVE.
APPLICATION FILED APR. 6, 1921.
1,426,401.
Patented Aug. 22, 1922.
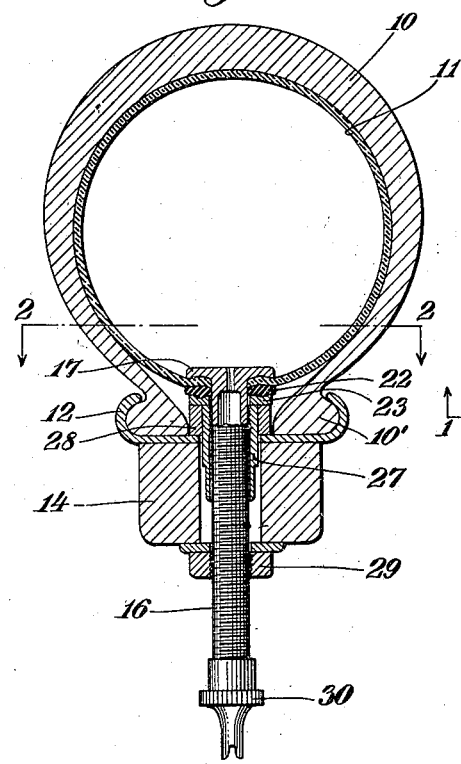
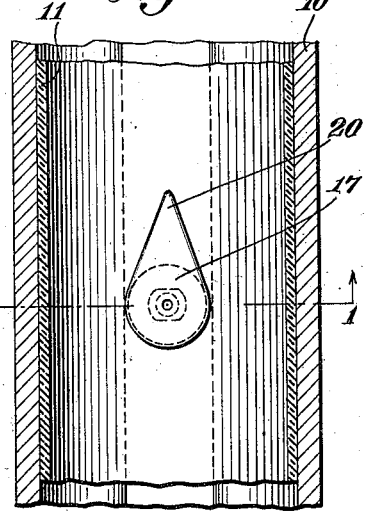
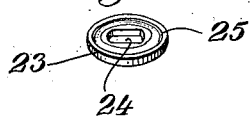
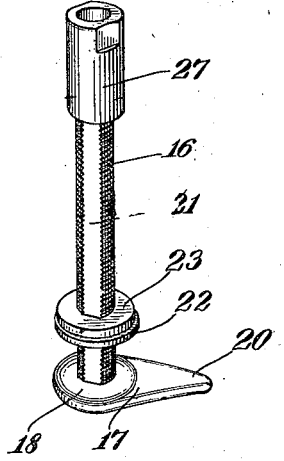
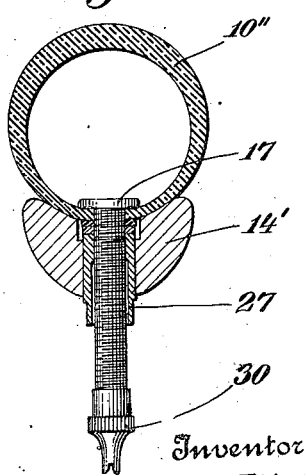
Inventor
Christian J. Müller.
By his Attorney
Charles L. Wright.

UNITED STATES PATENT OFFICE.

CHRISTIAN J. MÜLLER, OF PRINCE BAY, NEW YORK.

REPLACEMENT VALVE.

1,426,401. Specification of Letters Patent. Patented Aug. 22, 1922.

Application filed April 6, 1921. Serial No. 459,189.

*To all whom it may concern:*

Be it known that I, CHRISTIAN J. MÜLLER, a citizen of the United States, and a resident of Prince Bay, in the county of Richmond and State of New York, have invented certain new and useful Improvements in Replacement Valves, of which the following is a specification.

The principal object of this invention is to provide an air valve intended to be used for inflating elastic air containers such as bicycle, motor cycle, automobile tires, and similar articles.

Another object of this invention is to provide a valve that may be easily and quickly applied to or removed from a tube without the use of special tools or appliances and without damage to the tube.

Another object is to provide a valve of practical design at small cost, adapted to receive within its stem, an inner valve unit of the usual commercial interchangeable construction.

A final object is to provide an air valve having a head of peculiar form designed to overcome the difficulties encountered in assembling air valves to tubes and tires.

These objects are attained by the novel construction and combination of parts forming a material part of this disclosure and in which:—

Figure 1 is a transverse sectional view taken on line 1—1 of Figure 2 showing the valve body assembled to a conventional automobile tire and rim.

Figure 2 is a longitudinal sectional view along the line 2—2 of Figure 1 showing the position of the valve head when assembled with a tire or tube.

Figure 3 is a perspective view of the valve and clamping elements in detail.

Figure 4 is a transverse sectional view of a bicycle tire and rim showing the valve in assembled position.

Figure 5 is a perspective bottom plan view of the clamp collar.

Figure 6 is a sectional view of the clamp nut.

Referring to the drawings in detail the numeral 10 designates an automobile tire containing an inner tube 11, the shoe being confined by its beaded edges 10' in an annular metal rim 12 circumjacent the wooden felly 14 in which the wheel spokes are engaged.

A valve stem 16 is provided at its inner end with an enlarged flat head 17 annularly recessed on its under side to produce gripping rings 18, and extended in the form of a triangle 20 having a rounded point and bent in conformity with the curvature of the tire; on one side only for a purpose further on described.

The exterior of the hollow stem 16 is screw threaded its entire length and is flattened upon opposite sides, as at 21.

Fitting the stem is a leather or rubber washer or gasket 22 backed by a metallic washer 23 having an elongated opening 24 suited to slide on the stem but prevented from turning on it by the flats 21.

This washer has an annularly corrugated face, its rings 25 being similar to the rings 18 to which they are opposed, while between them is disposed the wall of the inner tube 16, the stem extending directly outward between the edges 10' of the shoe or tread element, and through appropriate openings in the rim 12 and felly 14.

The metal washer 23 is pressed towards the head 17 by a clamp nut 27 fitting the valve stem and disposed in the space between the nut 27 and rim 12 is a distance piece or collar 28.

The extending end of the valve stem has fitted to it a nut 29 which serves to clamp the valve stem to the felly, holding it rigidly in operative position and the extending end of the stem is suited to receive an air pump or other means for inflating the inner tube, it being understood that the valve stem acts as a conductor for the air to the interior of the tube 16 to which it is so adjusted as to prevent the opening of air except through its axial passage containing the usual check valve devices.

In the modification shown in Figure 4 the shoe 10' is held to the felly 14' by cement and the inner tube being dispensed with but in other respects the structure is similar, except a cap 30 is provided to protect the threads.

In operation, the parts being dismounted, the valve stem is grasped and so maneuvered as to insert the point of the angular element 20 into the valve opening in the deflated inner tube, a slight pressure only being required to sufficiently stretch the opening and permit the entire head 17 to pass through.

The grooves in the ringed faces 18 and 25 are supplied with cement and also the pliable washer 22, thereupon the nut 27 is brought to bear upon the washer 23 and so tightened as to clamp the wall of the inner tube tightly between the opposed faces, care being taken that the point 20 of the head element is directed lengthwise within the tube by means of a wrench applied to the flats 21 of the stem while the nut 27 is being set up.

The inner tube, if one be used, is then enveloped in the shoe, which in turn is secured in the rim element 12, the valve stem being passed through its openings and secured by the clamp nut 29, the spacer 28 having been adjusted in position to receive the thrust of the clamp nut.

The process of inflating the tire may then be proceeded with in the usual manner.

While certain preferred embodiments of this device have been shown and described it will be understood that changes in the forms, arrangements, proportions, sizes and details thereof may be made without departing from the scope of the invention as defined in the appended claims.

Having thus described my invention what I desire to secure by Letters Patent and claim, is:—

1. A valve of the kind described, comprising a screw-threaded stem flattened upon opposite sides, a thin flat head semi-circular at one end and extending angularly outward to a rounded point at its other end, said semi-circular portion being fixed to said stem, and means for securing said stem in operative position.

2. A valve of the kind described, comprising a screw-threaded stem flattened upon opposite sides, a thin flat head semi-circular at one end and extending angularly outward to a rounded point at its other end, a clamp washer having an opening suited to slide on said stem, an elongated nut engaging said stem abutting said washer, and a cap engaging the opposite end of said stem.

In testimony whereof I have signed my name to this specification.

CHRISTIAN J. MÜLLER.